006# United States Patent
Goetz et al.

[15] 3,670,021
[45] June 13, 1972

[54] CATALYZED HYDROLYSIS OF NITRILES TO AMIDES

[72] Inventors: Richard W. Goetz; Irving L. Mador, both of Cincinnati, Ohio

[73] Assignee: National Distillers and Chemical Corporation, New York, N.Y.

[22] Filed: Dec. 14, 1967

[21] Appl. No.: 690,431

[52] U.S. Cl.......................260/561 R, 260/404, 260/557 R, 260/558 R, 260/558 D, 260/561 R, 260/561 N, 260/561 K
[51] Int. Cl......................................................C07c 103/08
[58] Field of Search...............260/561, 561 U, 561 K, 558 R, 260/558 D, 404, 557 R

[56] References Cited

UNITED STATES PATENTS 3,040,095   6/1962   Gilbert et al..........................260/561

FOREIGN PATENTS OR APPLICATIONS 551,869   6/1932   Germany

*Primary Examiner*—Alex Mazel
*Assistant Examiner*—R. V. Rush
*Attorney*—Allen A. Meyer, Jr.

[57] ABSTRACT

Process for the hydrolysis of organic nitriles to form the corresponding amides by a reaction catalyzed by the presence of Group VIII or IIB metal-containing compounds or complexes at a pH range of from about 6.0 to 12.5, and preferably in the presence of a catalyst coordinating compound.

12 Claims, No Drawings

CATALYZED HYDROLYSIS OF NITRILES TO AMIDES

This invention relates to an improved process for the conversion of organic nitriles to amides. More particularly the invention pertains to an improved process for the preparation of amides from nitriles utilizing Group VIII or IIB metal-containing catalysts under controlled reaction conditions.

It is well-known in the chemical art that amides of organic carboxylic acids of the general formula RCONH₂ can be prepared from the corresponding acids, esters or acid chlorides by suitable reaction with ammonia. In many instances the preferred method is to start with the nitrile and convert it to the amide by hydrolysis. The hydrolysis proceeds in the presence of either acid or base. However, in most instances of this reaction, it is difficult to isolate the amide, the hydrolysis continuing further to form the corresponding acid. The reactions may be represented as follows:

This problem of producing the acid results from the fact that the rate of hydrolysis of the amide is faster than that of the nitrile (see for example, Astle's Industrial Organic Nitrogen Compounds, pp. 235–7 for a discussion of the reaction). An alternate procedure is to employ strong acids such as cold, concentrated sulfuric acid with the nitrile. This procedure has the disadvantage of requiring a molar excess of acid, and base equivalent to the acid in order to liberate the amide. Another proposal for achieving the conversion is by the use of an alkaline peroxide, but here at least an equivalent of the peroxide is needed and its high cost makes this method unattractive for commercial usage.

One object of the present invention is to provide a process for the preparation of amides from nitriles which avoids the disadvantages of the prior art processes.

Another object of the present invention is to provide an improved process for the conversion of nitriles to amides in high yields and conversions.

A further object of the present invention is to provide a catalytic process for the hydrolysis of nitriles to form the corresponding amides.

These and other objects of the present invention will become readily apparent from the ensuing description and illustrative embodiments.

In accordance with the present invention is has now been found that the conversion of organic nitriles to amides can be readily accomplished with outstanding results by carrying out the hydrolysis reaction in the presence of catalysts which are compounds of Group VIII or IIB metals. The metal components of such catalysts are ruthenium, rhodium, palladium, osmium, iridium, platinum, iron, cobalt, nickel, zinc cadium and mercury. They may be employed as their oxides, hydroxides, salts or complexes. The anion portion of the salt may be for example, chloride, bromide, nitrate, sulfate, cyanide, phosphate or organic carboxylate. Depending on the salt and pH, conversion of the salts to the hydroxide or oxide may take place in situ. Specific examples of catalysts are palladous chloride, sodium chloroplatinite, osmium tetroxide, rhodium phosphate, iridium chloride, ruthenium bromide, palladous acetate, o-phenanthroline palladium sulfate, ferric nitrate, phenyl mercuric hydroxide, zinc hydroxide and the like. Mixtures of such compounds may also be used as catalysts. The preferred catalysts are those containing the elements of the platinum and palladium triads of Group VIII. Of these, palladium containing catalysts are especially preferred. While such catalysts are generally soluble in the reaction medium, they may also be employed in a heterogeneous system or on a solid support and even as part of an ion exchange resin. Only catalytic amounts of the catalyst need be employed.

The nitriles which can be hydrolyzed include any organic nitriles of the general formula RCN, where R may be alkyl, alkenyl, cycloalkyl, aryl or alkaryl. The R group also may be substituted by halogen, nitro, hydroxy, ester or carbonyl radicals. Two or more nitrile groups may be present in the molecule in which case one or both may be converted to amide groups. Specific examples of such feed material include acetonitrile, propionitrile, isobutyronitrile, stearonitrile, benzonitrile, p-chlorobenzonitrile, toluonitrile, benzoylacetonitrile, cyclohexylcyanide, p-cyanoacetophenone, acrylonitrile, 2-methylene glutaronitrile and adiponitrile.

The water to nitrile molar ratio employed may range from about 0.1:1 to 10:1, and preferably from about 1:1 to 5:1. In order to obtain nearly complete conversion of the nitrile to the amide an amount of water equivalent to that of the amide must be present. Moreover, it is preferred to operate with an excess of water, up to three or four fold of that stoichiometrically required for reaction with nitrile present in the reaction mixture. Many nitriles are not very miscible with water and a two phase system will result. To increase the mutual solubility, an organic cosolvent may be employed. These cosolvents may be alcohols, ethers, amides; specific examples being ethanol, dioxane, tetrahydrofuran, dimethylformamide, or the like as well as mixtures thereof.

The reaction is conducted at a temperature from about 25° to 250° C, with a range of about 50° to 150° C. being preferred. The reaction may be carried out in a closed system at superatmospheric pressure, or frequently it is convenient to carry it out under atmospheric pressure at reflux temperature. An inert atmosphere or air may be present over the reaction mixture as desired.

The pH of the reaction mixture may vary from slightly acid to strongly alkaline. A pH in the range of 6 to 12.5 is preferred. The pH may be adjusted within the range at the start or during the course of the reaction. A buffer system such as sodium acetate or potassium phosphate may be employed to maintain the pH.

In accordance with another features of the present invention it has been found highly advantageous to have present in the reaction mixture a substance that coordinates with the metal catalyst. Especially useful are such materials having at least two coordinating groups. These materials may simply be added as such to the reaction mixture, or they may be added as performed complexes with the metal catalyst to the reaction zone. The amount of such ligands used will generally be between 0.5 to 2.0 mole equivalents based on the amount of metal catalyst, though larger quantities ranging up to ten or more mole equivalents may also be present. These ligands are characterized by having an oxygen, nitrogen or phosphorus atom whose unshared pair of electrons can coordinate to the metal atom comprising the catalyst. Examples of such substances are: pyridine, triphenylphosphine, 2,2'-bipyridyl, bisdiphenylphosphinoethane, o-phenanthroline, ethylenediamine, tetramethylethylenediamine, glycine, dimethylglyoxime, histidine, and 88-hydroxyquinoline. Preferred ligands of this group are pyridine, 2,2'-bipyridyl and o-phenanthroline.

The invention will be more fully understood by reference to the following illustrative embodiments.

EXAMPLE I

A. Sodium chloropalladite (0.35 g., 1.2 mmoles) was dissolved in a mixture of 12.5 ml. (230mmoles) acetonitrile and 8.0 ml. of water, 2,2'-Bipyridyl (0.71 g., 0.45 mmole) was added to the solution. During this addition, the color changed from red-brown to green-brown and a precipitate appeared. Aqueous 6N NaOH and water were then added until the pH was 10.4 and the total volume was 25 ml. The amount of water present in the final solution was 690 mmoles.

The resulting slurry was then transferred to 50 ml. flask equipped with a serum stoppered side arm, reflux condenser and magnetic stirring bar. On heating to reflux the solids dissolved. The reaction solution was sampled from time to time through the side arm using a hypodermic needle. Samples were taken from the reacting mixture after 5, 24, and 48 hours. The acetamide was determined by gas-liquid chromatography using a ½ X 4 inch column packed with 35 percent Paraplex G-25 polyester (Rohm and Haas) on acid washed DMCS treated Chromosorb P (Applied Science Laboratories). Acetic acid was also determined by gas-liquid chromatography after acidification of the sample with HCl. The results of these analyses were:

TABLE I

| Time, Hours | Conversion, % to Amide | Acid | Selectivity |
|---|---|---|---|
| 5 | 23 | 0 | 100 |
| 24 | 44 | 0.1 | 99.8 |
| 48 | 56 | 0.7 | 98.8 |

B. The series of runs set forth in Table II below demonstrates that very little hydrolysis takes place in the absence of a catalyst even in the preferred pH range of this invention. All reactions were conducted with 50—50 (volume) water-acetonitrile at reflux temperature for 24 hours.

TABLE II

| Run No. Initial pH | Conversion, % to Anide | Acid |
|---|---|---|
| 1   8 | T | 0 |
| 2   10 | T | 0 |
| 3   12 | 0.5 | 0 |
| 4*  12.3 | 3.8 | T |
| 5*  12.5 | 7.8 | 6.8 |

T = trace amount.
*In the presence of sodium phosphate buffer.

The above data show that even under conditions where reaction does take place, the selectivity (conversion to amide/conversion to amide plus acid) is very poor and would be completely worthless commercially.

B. The following Table III illustrates the use of sodium chloropalladite as a catalyst at various pH's. The experiments were performed in a manner similar to that described in Example I (A) above. The results are given for a 24 hour reaction time. These conversions when compared with those of Table II above show the effectiveness of the catalyst in converting nitriles to amides.

TABLE III

| Run No. | Initial pH | Conversion, % to Amide | Acid |
|---|---|---|---|
| 1 | 8.0 | 13.5 | T |
| 2 | 9.0 | 23.4 | T |
| 3 | 10.4 | 21.6 | 0.3 |
| 4 | 12.4 | 28.8 | 2.2 |

EXAMPLES III

The experiments shown in Table IV below demonstrate the use of a buffer, and were conducted in a similar fashion to Example 1. Trisodium phosphate was added to the reaction mixtures of Runs 1 and 2, in amount of 1.3 and 22.2 mmoles, respectively. In Run 3, 1.9 mmoles of disodium hydrogen phosphate were initially added.

TABLE IV

| Run No. | Initial pH | Conversion, % to Amide | Acid |
|---|---|---|---|
| 1 | 7.8 | 33.6 | T |
| 2 | 10.4 | 33.6 | 3.2 |
| 3 | 6.2 | 23.8 | T |

EXAMPLE IV

The use of various catalysts and ligands is illustrated below in Table V. All the reactions were conducted similarly to Example I (A). The catalyst concentration was 38 mmoles per liter. The ligand concentration is expressed in molar ratio to the catalyst. All the experiments were conducted at reflux temperature, with the exception of Exp. No. 10 which was carried out at 125° C.

TABLE V

| Run No. | Catalyst | Ligand Conc. | Ligand Type | Initial pH | Time, hrs. | Conversion, percent to Amide | Acid |
|---|---|---|---|---|---|---|---|
| 1 | RhCl₃ | 2 | Phen a | 12.7 | 24 | 18 | 1.0 |
| 2 | RuCl₃ | 1 | Phen | 12.0 | 65 | 9.5 | 0 |
| 3 | Na₂PdCl₄ | 0.4 | Dmg b | 11.9 | 48 | 31 | 4.3 |
| 4 | Na₂PdCl₄ | 0.4 | Phen | 12.1 | 48 | 56 | 1.5 |
| 5 | PdCl₂ | 1 | Bipy c | 12.0 | 48 | 75 | 3.0 |
| 6 | ZnCl₂ | | | 12.0 | 30 | 13 | 0.9 |
| 7 | C₆H₅HgOH | | | 12.0 | 24 | 3.4 | T |
| 8 | Fe(NO₃)₃ | | | 12.0 | 64 | 5.5 | T |
| 9 | Fe(NO₃)₃ | 1 | Phen | 12.0 | 72 | 7.4 | 0.2 |
| 10 | K₂PtCl₄ | 0.4 | Bipy | 12.0 | 66 | 13.0 | T |
| 11 | PdCl₂ | 2.0 | Py d | 12.0 | 48 | 42 | 3.1 |
| 12 | NiCl₂ | 1.0 | Bipy | 12.0 | 66 | 14 | 3.4 | a Phen = o-phenanthroline.
b Dmg = dimethylglyoxime.
c Bipy = 2,2'-bipyridyl.
d Py = pyridine.

EXAMPLE II

A. The o-phenanthroline complex of palladium sulfate was prepared. 0.4 Gram or 1.0 mmole, [(o-phenanthroline) Pd-SO₄·H₂O)] was added to 12.5 ml. water and then reacted with 0.32 g., 1.0 mmole, of Ba(OH)₂·8H₂O. After 3 hours at about 60° C., 12.5 ml. acetonitrile was added and the BaSO₄ precipitate removed by filtration. The pH of the solution was 10.4. After reflux temperature was reached, samples were removed at 3 and 24 hours and showed conversions of nitrile to acetamide of 30 and 70 percent, respectively.

EXAMPLE V

The catalyst preparation and procedure of Example II (A) was followed, except that about 70 volume percent of the water was substituted by another solvent. The conversions are given after 24 hours reaction time.

TABLE VI

| Run No. | Solvent | Conversion, % to Amide | Acid |
|---|---|---|---|

| | | | |
|---|---|---|---|
| 1 | N-methylpyrolidinone | 41 | T |
| 2 | 1,4-dioxane | 39 | T |

EXAMPLE VI

Following the procedure of Example II, various nitriles were used in place of acetonitrile. The results are tabulated in Table VII presented below.

TABLE VII

| Run No. | Nitrile | Initial pH | Product Identified |
|---|---|---|---|
| 1 | benzonitrile | 10 | benzamide |
| 2 | adiponitrile | 10 | 5-cyanovaleramide |
| 3 | acrylonitrile | 10 | acrylamide |
| 4 | methacrylonitrile | 10 | methacrylamide |

The above data show that the process of this invention may be effectively employed to convert a variety of organic nitriles to their corresponding amides without the operational difficulties encountered in or the special reactants required by the prior art processes.

Although the invention has been illustrated above in connection with certain preferred embodiments, it will be understood that the various modifications may be employed in the process without departing from its broader concepts.

What is claimed is:

1. A process for the preparation of organic amides which comprises hydrolyzing an organic nitrile, in an aqueous reaction mixture having a pH range of 6 to 12.5, in the presence of a catalyst which is a compound of a metal selected from the group consisting of ruthenium, rhodium, palladium, osmium, iridium and platinum, at a temperature of from 25° to 250° C.

2. The process of claim 1 wherein the temperature is from 50° to 150° C.

3. The process of claim 1 wherein said metal-containing catalyst is selected from the group consisting of palladous chloride, palladous acetate, sodium chloropalladite, o-phenanthroline, palladium sulfate, sodium chloroplatinite, potassium chloroplatinite, ruthenium chloride, ruthenium bromide, rhodium phosphate, rhodium chloride, iridium chloride, and osmium tetroxide.

4. The process of claim 1 wherein said metal is platinum.

5. The process of claim 1 wherein said metal is palladium.

6. The process of claim 1 in which the organic nitrile is selected from the group consisting of acetonitrile, propionitrile, isobutyronitrile, stearonitrile, benzonitrile, p-chlorobenzonitrile, toluonitrile, benzoylacetonitrile, cyclohexylcyanide, p-cyanoacetophenone, acrylonitrile, methacrylonitrile, 2-methyleneglutaronitrile and adiponitrile.

7. The process of claim 1 wherein the pH is controlled by means of a buffering system.

8. The process of claim 1 wherein the water to nitrile ratio ranges from 0.1:1.0 to 10:1.0.

9. The process of claim 1 wherein a ligand selected from the group consisting of pyridine, triphenylphosphine, 2,2'-bipyridyl, bisdiphenylphosphinoethane, o-phenanthroline, ethylenediamine, tetramethylethylenediamine, glycine, dimethylglyoxime, histidine, and 8-hydroxyquinoline is employed to form a coordination complex with the catalyst.

10. The process of claim 1 wherein said aqueous reaction mixture contains an organic solvent.

11. A process for the preparation of acetamide which comprises hydrolyzing acetonitrile, in an aqueous reaction mixture having a pH range of 6 to 12.5, in the presence of a palladium catalyst which is an oxide, a hydroxide, a complex or a salt selected from the group consisting of chlorides, bromides, nitrates, sulfates, phosphates and acetates, at a temperature of from 25° to 250° C.

12. A process for the preparation of organic amides which comprises hydrolyzing an organic nitrile, in an aqueous reaction mixture having a pH range of 6 to 12.5, in the presence of a catalyst which is a compound of a metal selected from the group consisting of ruthenium, rhodium, palladium, osmium, iridium and platinum, wherein said catalyst is an oxide, a hydroxide, a complex or a salt selected from the group consisting of chlorides, bromides, nitrates, sulfates, phosphates, and acetates, at a temperature of from 25° to 250° C.

* * * * *